United States Patent
Fukamachi

[19]

[11] Patent Number: 5,569,086
[45] Date of Patent: Oct. 29, 1996

[54] VISCOUS FLUID TORSIONAL VIBRATION DAMPENING DEVICE HAVING AN ELASTIC SLIDER CONFIGURED TO PROVIDE FRICTION DAMPENING

[75] Inventor: Masanobu Fukamachi, Hirakata, Japan

[73] Assignee: Kabushiki Kaisha Daikin Seisakusho, Osaka, Japan

[21] Appl. No.: 262,521

[22] Filed: Jun. 17, 1994

[30] Foreign Application Priority Data

| Jun. 24, 1993 | [JP] | Japan | 5-153491 |
| Jun. 24, 1993 | [JP] | Japan | 5-153492 |
| Jun. 24, 1993 | [JP] | Japan | 5-153493 |
| Jun. 24, 1993 | [JP] | Japan | 5-153494 |

[51] Int. Cl.⁶ .................................................. F16D 3/80
[52] U.S. Cl. .............................. 464/24; 464/64; 464/68
[58] Field of Search .............................. 464/62, 24, 64, 464/65, 66, 67, 68, 73, 7; 192/106.2; 74/574

[56] References Cited

U.S. PATENT DOCUMENTS

| 4,274,524 | 6/1981 | Nakane . |
| 4,351,167 | 9/1982 | Hanke et al. . |
| 4,638,684 | 1/1987 | Maucher . |
| 4,732,250 | 3/1988 | Maucher et al. . |
| 4,739,866 | 4/1988 | Reik et al. . |
| 4,777,843 | 10/1988 | Bopp . |
| 5,030,166 | 7/1991 | Worner et al. ............. 74/574 X |
| 5,097,722 | 3/1992 | Fukushima . |
| 5,156,067 | 10/1992 | Umeyama . |
| 5,180,044 | 1/1993 | Fukushima et al. . |
| 5,194,045 | 3/1993 | Hanke ...................... 74/574 X |
| 5,279,182 | 1/1994 | Fukushima ................. 74/574 X |
| 5,355,747 | 10/1994 | Kajitani et al. ............. 74/574 X |

FOREIGN PATENT DOCUMENTS

| 0250913 | 1/1988 | European Pat. Off. ........ 74/574 |
| 194433 | 7/1992 | Japan . |

*Primary Examiner*—Daniel P. Stodola
*Assistant Examiner*—William A. Rivera
*Attorney, Agent, or Firm*—Shinjyu Office of Patent Attorneys

[57] ABSTRACT

A flywheel assembly comprises a first flywheel, a second flywheel supported on the first flywheel so as to be rotatable, a drive member connected to said first flywheel to ensure a space in which viscous fluid can be contained therebetween, a driven member connected to the second flywheel to constitute, together with the first flywheel and the drive member, a fluid chamber with which viscous fluid is filled, a coil spiring for elastically connecting the members to each other, and a viscous damper part for moving viscous fluid in the fluid chamber in response to relative rotation between both the members to create viscous resistance. The driven member has a window hole containing the coil spring and a fluid supplying path connecting with the fluid chamber from the window hole. The viscous damper part has chokes for creating viscous resistance when the first flywheel and the driven member are relatively rotated. The chokes are opened and closed by sliders which can be pressed against the wall of the fluid chamber in a dry friction state. The driven member has a plurality of recesses concaved radially inward on its outer peripheral surface. The sliders respectively have projections projected into the recesses of the driven member, and the chokes are formed between the recesses and the projections.

16 Claims, 11 Drawing Sheets

VISCOUS FLUID TORSIONAL VIBRATION DAMPENING DEVICE HAVING AN ELASTIC SLIDER CONFIGURED TO PROVIDE FRICTION DAMPENING

BACKGROUND OF THE INVENTION

The present invention relates generally to a torsional vibration damping device, and more particularly, to a torsional vibration damping device for use between an input rotation member and an output rotation member of a power transmission apparatus.

Viscous or fluid dampening devices employed in automotive flywheel devices are known. Such dampening devices are typically disposed between an input flywheel and an output flywheel of a flywheel assembly or power transmission apparatus. Examples of this type of conventional device include a flywheel device used in, for example, the engine of an automobile.

One such prior art device in includes a first flywheel, a second flywheel coupled coaxially to the first flywheel for limited rotary displacement, and a viscous damper mechanism disposed between both the flywheels for elastically connecting the flywheels to each other and dampening torsional vibration between the flywheels by the viscous resistance of viscous fluid in response to rotary displacement between the two flywheels. The viscous dampening mechanism has an annular case fixed to the first flywheel and choke activating members disposed so as to be circumferentially movable within the annular case. The annular case is filled with viscous fluid. The dampening mechanism includes an output member connected to the second flywheel, and has a plurality of projections projected into the annular case. The choke activating members are in a cap shape, and are respectively fitted in the projections of the output member and are movable through a predetermined angle relative to the projections. Chokes through which viscous fluid can pass are formed between the choke activating members and the projections.

In the above described conventional torsional vibration damping device, fluid passes through the chokes formed between the choke activating members and the projections of the output member in response to relative displacement of the first and second flywheels. The chokes limit fluid passage thus dampening vibration during relative displacement of the flywheels. In addition, if respective ends of the choke activating members abut against the projections, the chocks are closed.

In the conventional device, however, there is typically insufficient resistance force to restrain the longitudinal vibration of the body of an automobile during tip-in and tip-out of the automobile and the vibration thereof when starting the engine. The reason for this is that the volume of viscous fluid in the annular case is insufficient, thereby to make it difficult to obtain a sufficient resistance force.

In the above described conventional torsional damping device, a radially outer surface of the output member functions as a part of each chokes. Since the radial outer surface of the output member has a plurality of radial projections, it is difficult to manufacture, machine or process the radially outer surface of the output member with high precision.

SUMMARY OF THE INVENTION

An object of the present invention is to obtain a large damping force which has not been obtained in the conventional construction.

Another object of the present invention is to replenish a fluid chamber with a sufficient amount of viscous fluid to obtain desired viscous resistance.

Still another object of the present invention is to make it easy to manufacture and process an output member.

A torsional vibration damping device according to a first aspect of the present invention is a torsional vibration damping device of a power transmission apparatus having an input rotation member and an output rotation member which is connected to the input rotation member so as to be relatively rotatable and to which power from the input rotation member is transmitted. The torsional vibration damping device includes a viscous damping part and a dry friction part. The viscous damping part is formed between the input rotation member and the output rotation member and includes a choke through which fluid passes in response to relative rotation between the input rotation member and the output rotation member for damping torsional vibration. The dry friction part damps the torsional vibration by dry friction in response to rotary displacement of the input and output members.

The relative displacement between the input rotation member and the output rotation member causes fluid to pass through the choke of the viscous damping part. The choke provides a viscous resistance force to damp the torsional vibration. In addition, the dry friction part produces a dry frictional force.

According to a second aspect of the present invention, a torsional vibration damping device of a power transmission apparatus includes an input rotation member and an output rotation member which are connected to each other to allow for limited rotary displacement therebetween and through which power is transmitted. The limited rotary displacement is defined by two angular displacement ranges, a first range and a second range, the second range being larger that the first range.

The apparatus includes an input member, an output member and a viscous damper mechanism. The input member is connected to the input rotation member, to constitute, together with the input rotation member, an annular fluid chamber filled with viscous fluid. The output rotation member is connected to the output rotation member, and has an abutting part projected into the fluid chamber. The viscous damper mechanism produces a first viscous damping force in the first displacement range, and produces a second viscous damping force in the second displacement range, the second damping force greater than the first damping force. The viscous damper mechanism is provided in the fluid chamber, and has first and second chokes through which fluid passes in response to relative rotation between the input rotation member and the output rotation member and a choke activating member moved in the fluid chamber to open and close the first choke. The choke activating member has an abutting part which abuts against the output member to press one surface of the choke activating member against a wall surface of the fluid chamber in a dry friction state for damping torsional vibration.

If the input rotation member and the output rotation member are relatively rotated in the first displacement range, fluid passes through the first choke to produce the first viscous damping force. If the relative torsional angle is increased, an abutting part of the choke activating member abuts against the abutting part of the output member, to close the first choke. Fluid passes through the second choke in the second displacement range to produce the second viscous damping force.

If the choke activating member abuts against the output member and then, the relative torsional angle is further increased, one surface of the choke activating member is pressed against the wall surface of the fluid chamber by the abutment. A fluid film between the surface of the choke activating member and the wall surface of the fluid chamber is removed by the pressing, whereby both the choke activating member and the fluid chamber slide while being pressed against each other in a dry friction state. Therefore, a large frictional force is obtained.

In this construction, the dry friction state is caused by a part of the choke activating member for opening and closing the first choke. Therefore, it is possible to obtain a large frictional force in a simple structure.

According to a third aspect of the present invention, an input rotation member to which power is inputted is connected to an output rotation member so as to be relatively rotatable therewith and through which the power from the input rotation member is transmitted, a viscous damping part and an annular sealing member are disposed between input and output members.

The above described viscous damping part is formed between the input rotation member and the output rotation member and includes a choke through which fluid passes in response to relative rotation between the input rotation member and the output rotation member and an annular fluid chamber filled with viscous fluid. The annular sealing member is pressed against both the rotation members when pressure is exerted on the fluid chamber, to seal viscous fluid with which the fluid chamber is filled.

If power is inputted to the input rotation member, the power is transmitted to the output rotation member. If the torsional vibration is transmitted to the input rotation member, both the rotation members are relatively rotated, whereby a viscous resistance force is produced by viscous fluid in the annular fluid chamber to damp the torsional vibration. Since the pressure is exerted on the fluid chamber at the time of the relative rotation, the annular sealing member is pressed against both the rotation members. Therefore, it is possible to reduce the leakage of viscous fluid from the annular fluid chamber, thereby to obtain a large resistance force.

A fourth aspect of the present invention includes a torsional vibration damping device of a power transmission apparatus having an input rotation member and an output rotation member which are connected to each other so as to be relatively rotatable and through which power is transmitted. The torsional vibration damping device comprises an input member, an annular output member, and a plurality of slide stoppers. The input member is connected to the input rotation member and together with the input rotation member, forms an annular fluid chamber. The annular output member is connected to the output rotation member, and has its radially outer surface forming a part of the fluid chamber and having a plurality of recesses directed radially inward. The plurality of slide stoppers are disposed so as to be circumferentially movable in the annular fluid chamber and respectively have projections projected into the recesses of the output member to form chokes through which fluid can pass.

If the slide stoppers are moved in the fluid chamber by torsional vibration, the torsional vibration is damped by a resistance force produced when fluid passes through the chokes.

The radially outer portion of the output member need not be provided with projections. Consequently, the radially outer surface of the output member can be subjected to lathe machining, whereby the radially outer surface forms high-precision chokes.

A fifth aspect of the present invention includes a first flywheel and a second flywheel supported on the first flywheel so as to be rotatable, first and second members, an elastic member, and a viscous damping part. The first member is connected to the first flywheel, to ensure a space in which viscous fluid can be contained therebetween. The second member is connected to the second flywheel, to constitute, together with the first flywheel and the first member, a fluid chamber with which viscous fluid is filled. The elastic member elastically connects the first and second members to each other. The viscous damping part moves viscous fluid in the fluid chamber to create viscous resistance in response to relative rotation between the first and second members. The second member has a window hole for containing the elastic member, and has a fluid supplying path connecting with the fluid chamber from the window hole.

If torque is inputted to the first flywheel, the torque is transmitted from the first member to the second member through the elastic member, to further rotate the second flywheel. If torsional vibration is transmitted to radially rotate the first flywheel and the second flywheel, the elastic member repeatedly expands and contracts and the viscous damping part produces viscous resistance, to damp the torsional vibration. At this time, when viscous fluid leaks out of the fluid chamber, the fluid chamber is replenished with viscous fluid through the fluid supplying path from the window hole of the second member. Since the inside of the window hole of the second member is a place where the largest amount of viscous fluid is accumulated, the fluid chamber is replenished with a sufficient amount of viscous fluid, to obtain a desired viscous resistance force.

The foregoing and other objects, aspects and advantages of the present invention will become more apparent from the following detailed description.

DESCRIPTION OF THE PREFERRED EMBODIMENTS

Figure 1:
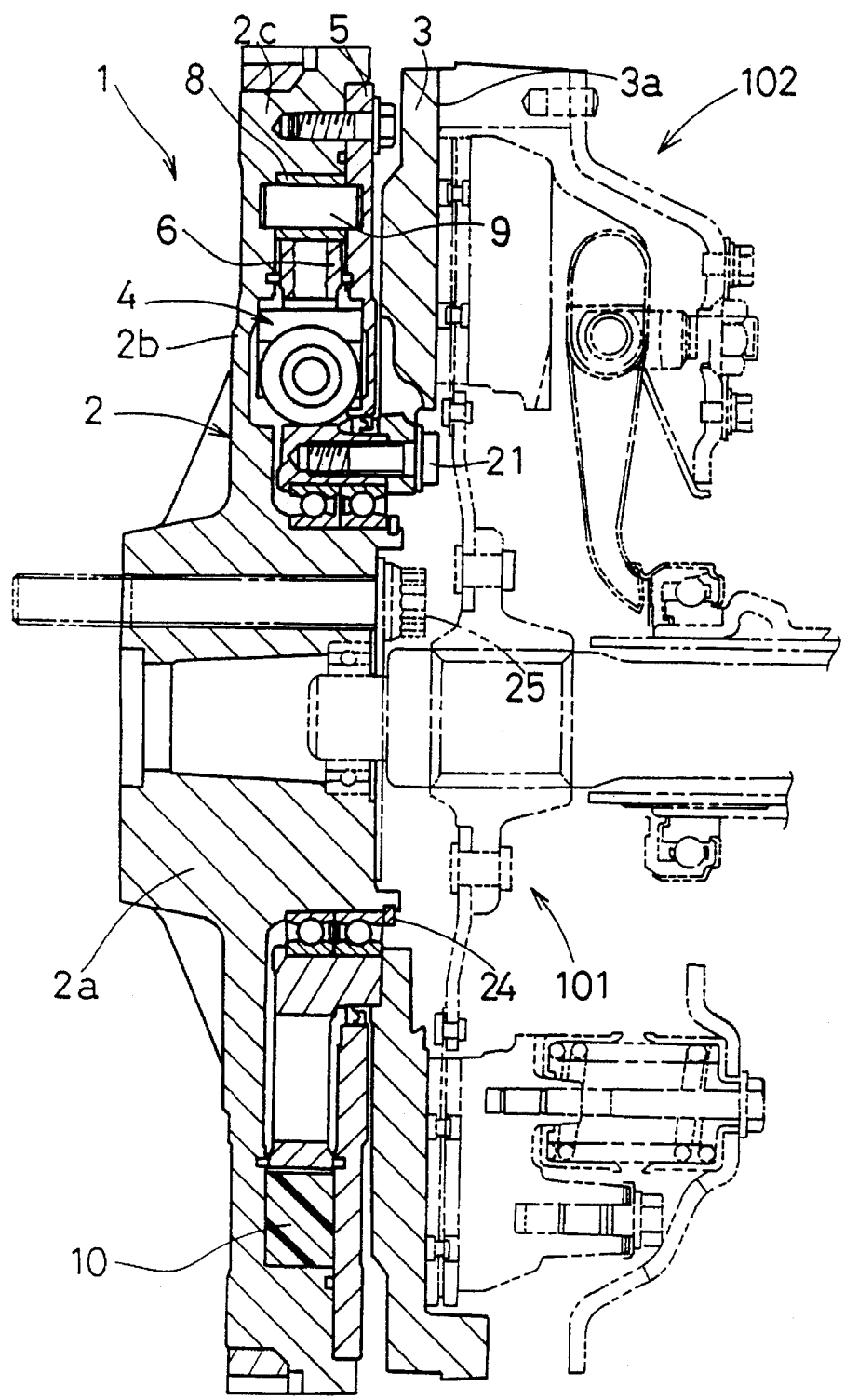
FIG. 1 is a schematic cross sectional view showing a power transmission apparatus employing one embodiment of the present invention.

FIG. 1 shows a power transmission apparatus employing one embodiment of the present invention. The left side is the front side (engine side) and the right side is the rear side (transmission side).

The power transmission apparatus is mainly composed of a flywheel assembly 1, a clutch disc 101, and a clutch cover assembly 102.

As shown in FIGS. 1 through 4, the flywheel assembly 1 mainly comprises a first flywheel 2, a second flywheel 3, and a viscous damper mechanism 4 disposed between the first flywheel 2 and the second flywheel 3. The first flywheel 2 is fixed to an end of an engine crankshaft by a bolt 25. The second flywheel 3 has a friction surface 3a against which a friction member of the clutch disc 101 is pressed on its rear side surface. In addition, a clutch cover of the clutch cover assembly 102 is fixed to a radially outer portion of the friction surface 3a.

The first flywheel 2 is a substantially disc-shaped member, and has a hub portion 2a, a disc portion 2b extending outward from the hub portion 2a and formed integrally therewith, and a rim 2c extending backward from a radially outer portion of the disc portion 2b. An annular recess is formed between the hub portion 2a and the rim 2c, and the viscous damper mechanism 4 is contained in the recess. Two rolling bearings 22 and 23 are mounted side-by-side on a radially outer portion of the hub portion 2a. Each of the bearings 22 and 23 is one of a lubricant sealing type having sealing members mounted on both its sides. A snap ring 24 is fitted in a radially outer surface of the hub portion 2a to regulate backward movement of the bearings.

The second flywheel 3 is a substantially disc-shaped member, and its radially inner portion is removably fixed to a driven member 6 (as described below) of the viscous damper mechanism 4 by a bolt 21. In addition, a radially inner end of the second flywheel 3 regulates the backward movement of the rolling bearings 22 and 23. Further, a hole 3b is formed in the radially inner portion of the second flywheel 3 allowing the clutch disc 101 and the viscous damper mechanism 4 to communicate with each other.

Figure 2:
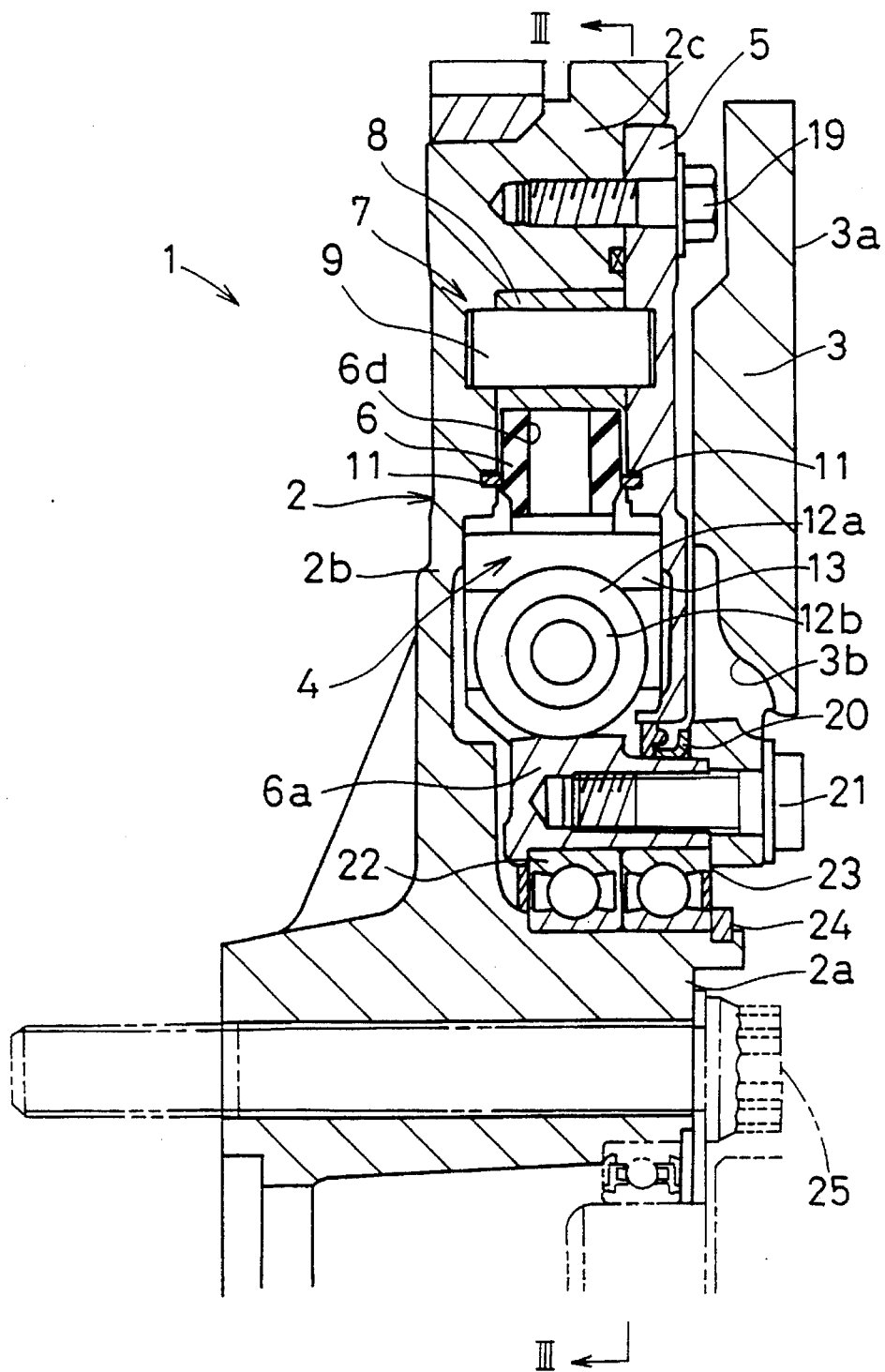
FIG. 2 is a partially enlarged view showing the upper half of FIG. 1.
Figure 3:
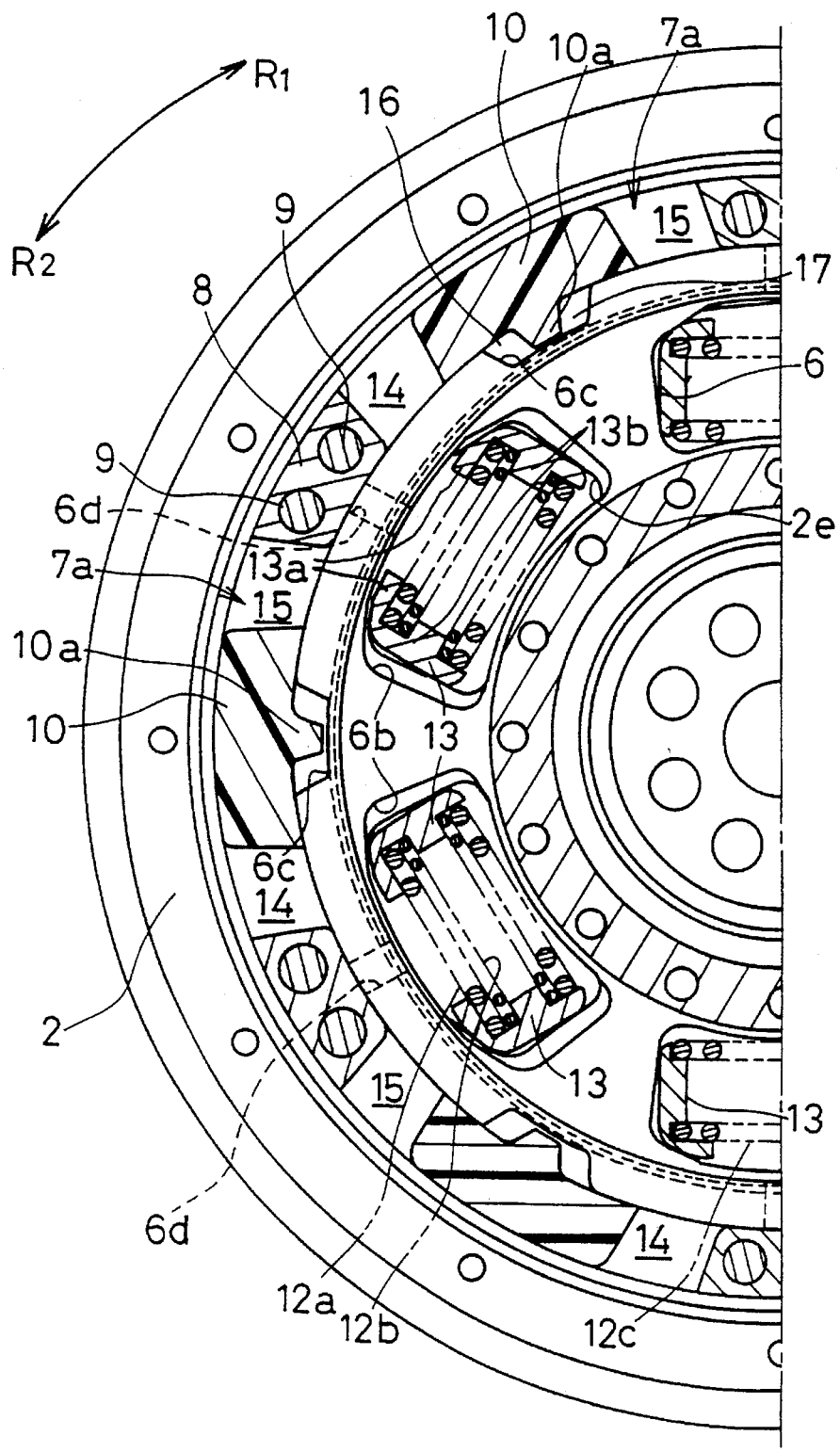
FIG. 3 is a partially sectional view taken along a line III—III shown in FIG. 2.

The viscous damper mechanism 4, shwon in FIG. 2, is mainly composed of a disc-shaped drive plate 5 fixed to the first flywheel 2, a disc-shaped driven member 6 having its radially inner portion supported on the first flywheel 2 through the rolling bearings 22 and 23, coil springs 12a, 12b and 12c for elastically connecting an input member comprising the first flywheel 2 and the drive plate 5 and the driven member 6 to each other in the circumferential direction, the above members being shown in FIGS. 2 and 3. The viscous damper mechanism 4 further includes a viscous damper part 7 for damping torsional vibration by viscosity of fluid, as indicated in FIG. 2 and described in grerater detail below. The viscous damper mechanism 4, has an annular chamber 7a formed by the first flywheel 2, the drive plate 5, and the driven boss 6a of the driven member 6 is filled with viscous fluid. A radially outer end of the drive plate 5 is fixed to the rim 2c of the first flywheel 2 by a plurality of bolts 19. An annular sealing member 20 is disposed between a radially inner end of the drive plate 5 and the driven boss 6a of the driven member 6. The sealing member 20 and the above described sealing members of the bearings 22 and 23 seal a radially inner end of the above described annular chamber 7a.

Since the drive plate 5 is mounted on the first flywheel 2 by the bolts, the viscous damper mechanism 4 can be replaced by removing the drive plate 5. Consequently, the viscous damper mechanism 4 can be overhauled, thereby making it possible to cope with a large-sized vehicle.

The driven member 6 is a casting member formed in a disc shape, and is disposed between the disc portion 2b of the first flywheel 2 and the drive plate 5. The driven member 6 has the driven boss 6a flanged backward from its radially inner portion, as described above. The rolling bearings 22 and 23 are mounted on a radially inner portion of the driven boss 6a, and the radially inner portion of the second flywheel 3 is fixed to the driven boss 6a by the bolt 21. Six window holes 6b are formed circumferentially equidistant in a radially intermediate portion of the driven member 6. The window holes 6b extend in the direction of rotation, and coil springs 12a, 12b and 12c are contained in the window holes 6b.

As shown in FIG. 3, the coil springs 12c are respectively contained in the radially opposing two window holes 6b (the window holes in the vertical direction of FIG. 3) out of the six window holes 6b of the driven member 6. The coil spring 12c abuts against end surfaces in the circumferential direction of the window hole 6b through spring sheets 13. The large-diameter coil spring 12a and the small-diameter coil spring 12b disposed therein are contained in each of the remaining four window holes 6b.

Although spring sheets 13 are disposed in both ends of the coil springs 12a and 12b, predetermined clearances are respectively ensured between the spring sheets 13 and the end surfaces in the circumferential direction of the window hole 6b in a torsion free state. The spring sheet 13 has a radially outer supporting part 13a and a boss 13b. The large diameter coil spring 12a has its radially outer portion supported on the radially outer supporting parts 13a of the spring sheets 13, and the small diameter coil spring 12b has its radially inner portion supported on the bosses 13b of the spring sheets 13. The coil springs 12a and 12b are prevented from interfering with each other because they are coaxially retained by the spring sheets 13.

The first flywheel 2 and the drive plate 5 respectively have abutting parts which abut against ends of each of the spring sheets 13, whereby the input member comprising the first flywheel 2 and the drive plate 5 and the driven member 6 are elastically connected to each other in the direction of rotation. In FIG. 3, an abutting part 2e of the first flywheel 2 is illustrated.

The viscous damper part 7 is mainly composed of an annular fluid chamber 7a, and a stopper member 8 and a a slider element 10, hereinafter referred to as slide stopper 10 formed of an elastic resin material, which are disposed in the annular fluid chamber 7a.

The annular fluid chamber 7a, described above, is further constructed to be enclosed by a radially inner surface of the rim 2c of the first flywheel 2, a radially outer surface of the driven member 6, and the disc portion 2b of the first flywheel 2 and the drive plate 5. It is filled with viscous fluid. Six stopper member 8 are disposed circumferentially equidistant in the annular fluid chamber 7a, and divide the annular fluid chamber 7a into six division chambers. The stopper member 8 is connected to the first flywheel 2 and the drive plate 5 by pins 9 so as not to be relatively rotatable. A choke $C_2$ through which viscous fluid can pass between the division chambers is formed between a radially inner surface of the stopper member 8 and the radially outer surface of the driven member 6. Recesses 6c are formed between the window holes 6b on a radially outer edge of the driven member 6; each recess is concave and all are generally circumferentially equidistantly spaced apart from each other. Each recess is formed with inclined surfaces 6e (see FIG. 4) which serve as cam surfaces, as described further below. A liquid supplying hole 6d extending radially outward from the center of the window hole 6b and opening to the annular fluid chamber 7a is formed in the middle between the adjacent recesses 6c. This hole 6d is positioned in the center of the stopper member 8 in a torsion free state.

The slide stopper 10 is formed of resin, and is disposed between adjacent stopper members 8. Within the chamber the stopper members 8 and the slide stoppers 10 further define first arcuate chambers 14 and a second arcuate chambers 15. The slide stopper 10 has its radially outer surface formed in a circular arc shape along the radially outer surface of the rim 2c and has its radially inner surface formed in a circular arc shape along the radially outer surface of the driven member 6. The slide stopper 10 has a projection 10a projected radially inward from its center. The projection 10a is disposed in the recess 6c of the driven member 6 and divides it into a first sub-chamber 16 and a second sub-chamber 17. Each projection 10a is provided with cam surfaces 10b. Further, a choke $C_1$ through which viscous fluid can pass between the first sub-chamber 16 and the second sub-chamber 17 is formed between a radially inner end of the projection 10a and the bottom surface of the recess 6c.

The choke $C_1$ is so formed as to have a larger flow passage cross-sectional area than that of the choke $C_2$. In addition, the inclined surfaces 6e of the recess 6c and the cam surfaces 10b of the projection 10a of the slide stopper 10 are complimentarily inclined. When any of the surfaces 10b and 6e abut one another, the choke $C_1$ closes restricting fluid flow. If the cam surfaces 10b and the surfaces 6e are further pressed against one another during relative motion of the flywheels 2 and 3, the slide stopper 10 is urged radially outward due to the inclination of the surfaces 10b and 6e, as described below with respect to the force diagram in FIG. 6.

Figure 5:
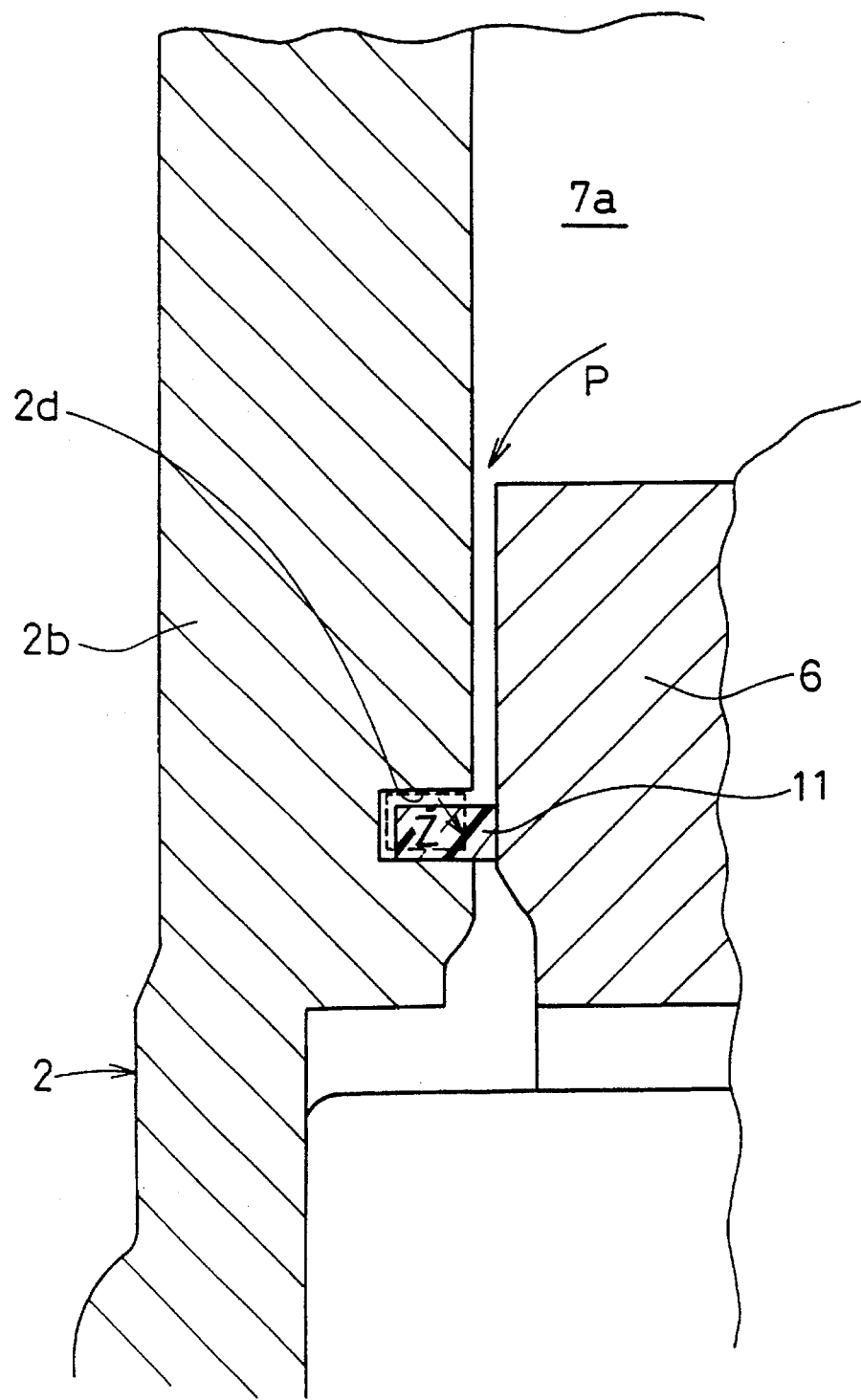
FIG. 5 is a partially enlarged view of FIG. 2.

A radially inner portion of the annular fluid chamber 7a is sealed by annular sealing members 11 formed of Teflon or heat-resistant and wear-resistant resin. The sealing members 11 are respectively disposed between the first flywheel 2 and the driven member 6 and between the drive plate 5 and the driven member 6. As shown in detail in FIG. 5, one of the sealing members 11 is movably disposed between an annular groove 2d formed in the first flywheel 2 and an end surface of the driven member 6. Although the sealing member 11 is disposed in the annular groove 2d, as indicated by a dotted line in FIG. 5, when no pressure is applied to the annular fluid chamber 7a, the sealing member 11 is moved to a position indicated by a solid line in FIG. 5, and when pressure P is applied, the radially inner portion of the annular fluid chamber 7a becomes sealed, the movement of the seal indicated in FIG. 5 by the arrow Z depicted within the seal 11. A similar annular groove is also formed in the drive plate 5, and the other sealing member 11 is disposed inside.

The benefit of the above described construction is that it is not necessary to have radial projections extending from the driven member 6, thus radial outer surface can be processed of the driven member 6 can be processed and the choke $C_2$ may be formed easily and precisely by lathe. Manufacturing costs are thus reduced, and since the slide stoppers 10 are formed separately, the formations of projections are made easy.

Description is now made of operations of the flywheel assembly according to the above described embodiment.

When torque is input to the first flywheel 2 from the crankshaft on the engine side, the torque is subsequently transmitted to the second flywheel 3 through the driven member 6, the coil springs 12a, 12b and 12c, as well as the viscous damper mechanism 4. At this time, if torsional vibration is inputted from the engine, the coil springs 12a, 12b and 12c repeatedly expand and contract, and the viscous damping part 7 produces a viscous resistance force to damp torsional vibration.

Figure 4:
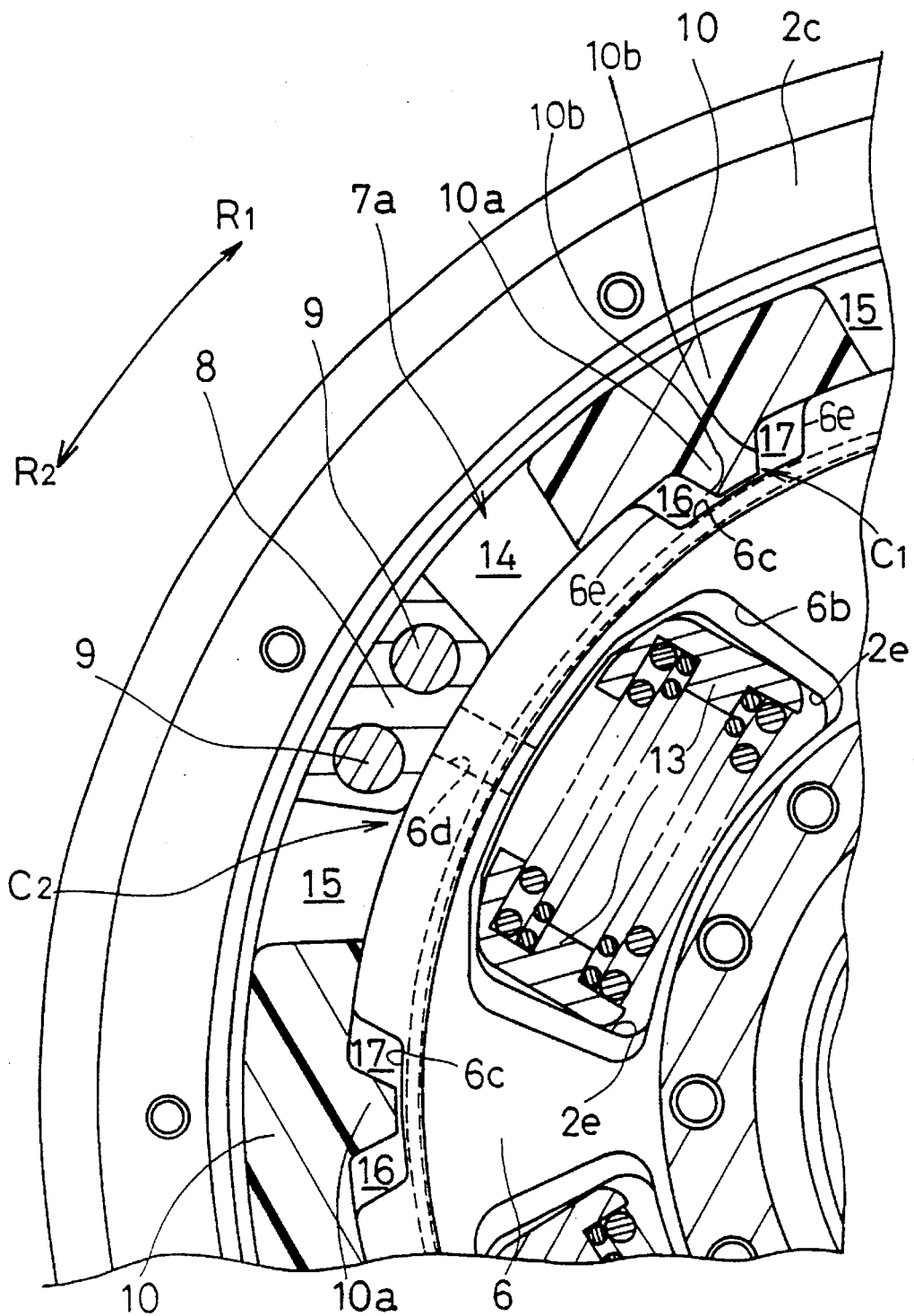
FIG. 4 is a partially enlarged view showing the upper half of FIG. 3.

With reference to FIG. 4, description is now made of operations at the time of relative rotation between the first flywheel 2 and the second flywheel 3.

When torque is input to the first flywheel 2 from the crankshaft on the engine side, the first flywheel 2 and the drive plate 5 are rotated relative to the driven member 6. The first flywheel 2 and the drive plate 5 then rotate in the direction of rotation $R_1$ away from their position in a torsion free state shown in FIG. 4. When the drive plate 5 rotates in the direction of rotation $R_1$ relative to the driven member 6, the slide stopper 10 is similarly moved in the direction of rotation $R_1$. Consequently, the volume of the second sub-chamber 17 is decreased and at the same time, the volume of the first sub-chamber 16 is increased. Specifically, fluid in the second sub-chamber 17 flows to the first sub-chamber 16 through the choke $C_1$ as the slide stopper 10 is moved. Since the flow passage cross-sectional area of the choke $C_1$ is large, the viscous resistance thereof is small. In addition, only the coil spring 12c is compressed in a range of small torsional angle, while the coil springs 12a and 12b are not compressed until the spring sheet 13 abuts against the window hole 6b of the driven member 6. Consequently, low rigidity and small viscosity are exerted up to the point where the spring seat 13 abuts against the window hole 6b (i.e. a small torsional displacement angle).

Figure 6:
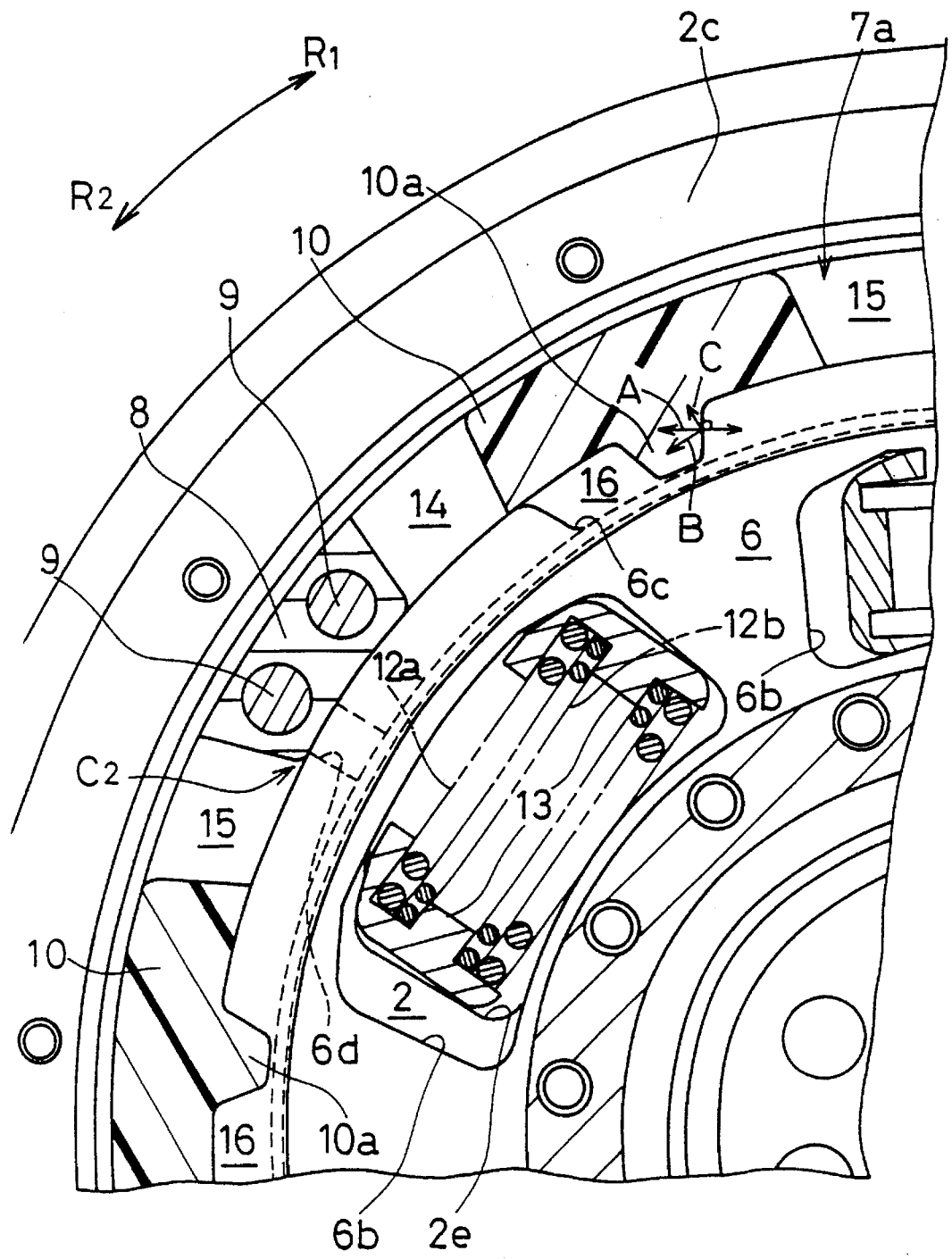
FIG. 6 is a view similar to FIG. 4, showing relative displacement of various elements of the present invention.

If the torsional displacement angle in the direction of rotation $R_1$ is increased, the projection 10a of the slide stopper 10 abuts against the end surface of the recess 6c of the driven member 6 (see FIG. 6). Consequently, the choke $C_1$ is closed and then the choke $C_2$ functions. The projection 10a is pressed against the end surface of the recess 6c, i.e. cam surface 10b engage surfaces 6e, a force A perpendicular to both abutting inclined surfaces is produced. The force A can be separated into a circumferential component of force B and a radial component of force C. The component of force C and a centrifugal force cause the slide stopper 10 to be pressed radially outward, whereby the radially outer surface of the slide stopper 10 is pressed against the radially inner surface of the rim 2c, and thus eliminating any clearance therebetween. If the first flywheel 2 continues to rotate relative to the slide stopper 10, where the stopper 10 is fixed to the driven member 6, a large resistance force is produced therebetween due to dry friction. The resistance force can be adjusted by manipulation of the complimentary angles of the abutting inclined surfaces 10b and 6e of the projections 10a and the recess 6c.

Figure 7:
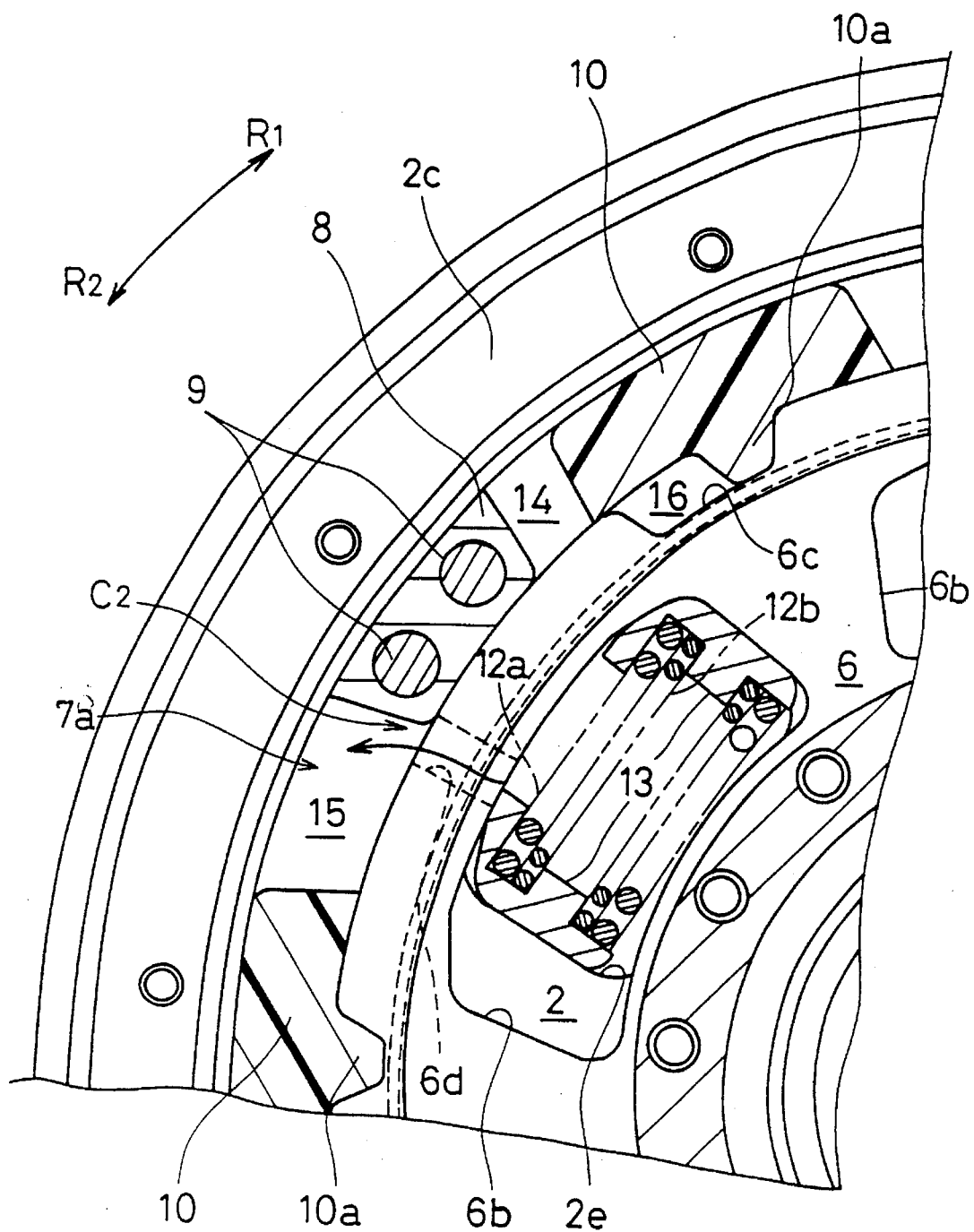
FIG. 7 is a view similar to FIGS. 4 and 6 showing further relative displacement of various elements of the present invention.

If the torsional angle shown in FIG. 6 is further increased to that shown in FIG. 7, the coil springs 12a and 12b start to be compressed. In the angular displacement range where springs 12a and 12b are compressed, high rigidity characteristics or responses are obtained. At the same time, fluid in the first arcuate chamber 14 flows into the second arcuate chamber 15 through the choke $C_2$. Since the flow passage cross-sectional area of the choke $C_2$ is small, large viscous resistance is experienced. The above described dry frictional resistance is added to the viscous resistance, thereby obtaining a large resistance force.

Furthermore, the stopper member 8 is moved in the direction of rotation $R_1$ at this time, whereby the liquid supplying hole 6d of the driven member 6 opens to the second arcuate chamber 15. Therefore fluid, accumulated in the window hole 6b of the driven member 6, quickly flows into the second arcuate chamber 15 by the centrifugal force and an increased attraction force from the second arcuate chamber 15. Since the inside of the window hole 6b is a place where the largest amount of viscous fluid is accumulated in the radially inner portion of the annular fluid chamber 7a, a sufficient amount of fluid can be returned to the annular fluid chamber 7a, thereby making it difficult to cause the shortage of fluid in the annular fluid chamber 7a.

Figure 8:
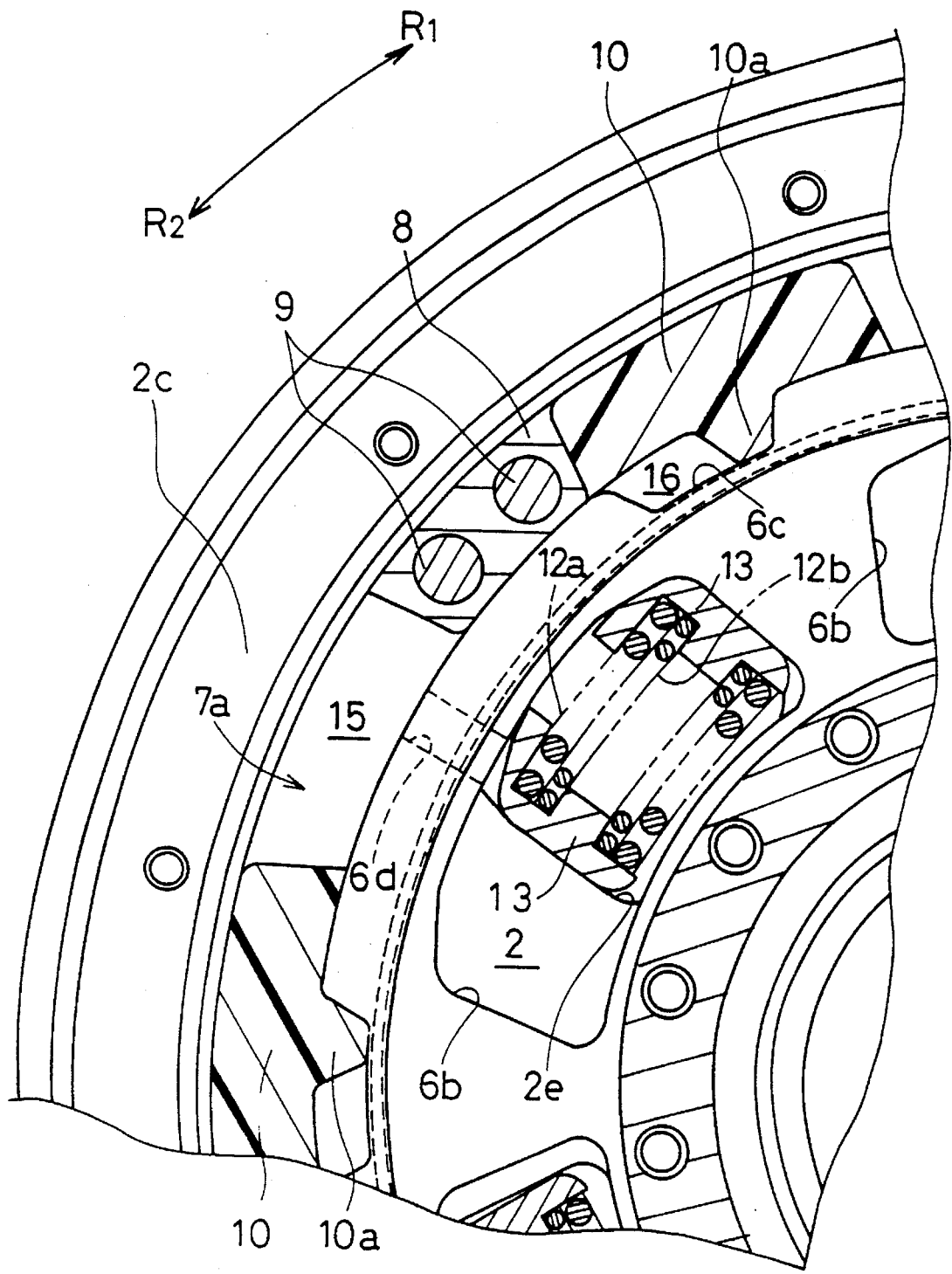
FIG. 8 is a view similar to FIGS. 4, 6 and 7 showing still further relative displacement of various elements of the present invention.

If the torsional angle shown in FIG. 7 is increased to that shown in FIG. 8, the stopper member 8 abuts against the slide stopper 10. Consequently, the relative rotation between the first flywheel 2 and the drive plate 5 and the driven member 6 is constrained.

Figure 9:
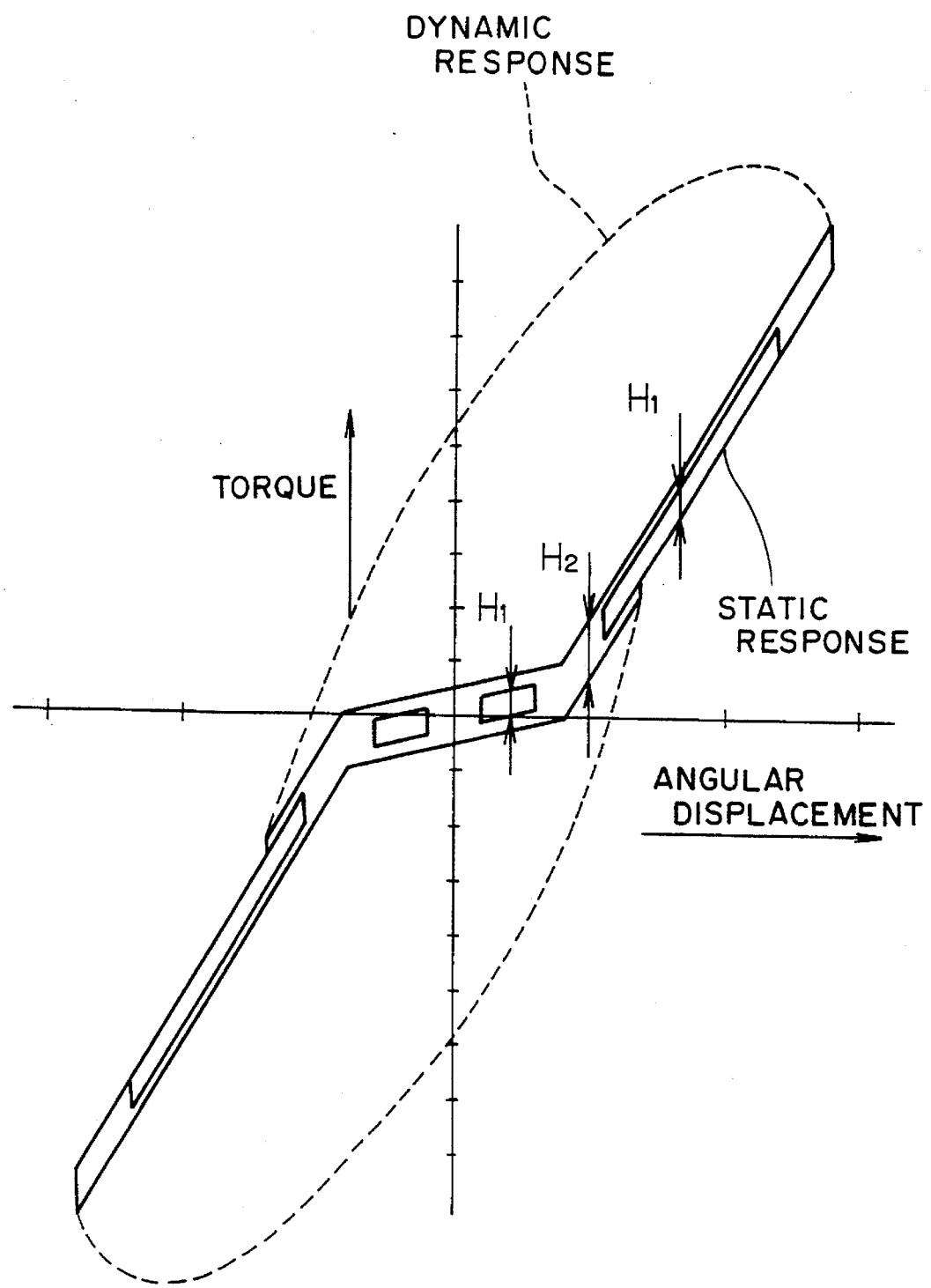
FIG. 9 is a graph showing the torsional characteristics of a flywheel assembly.

FIG. 9 is a diagram showing torsional characteristics of the flywheel assembly 1, where a solid line indicates static torsional characteristics, and a dotted line indicates dynamic torsional characteristics. In the static torsional characteristics, a region of small hysteresis torque $H_1$ which can be seen in a range of small torsional angle is an angle range in which the slide stopper 10 is rotated relative to the driven member 6 so that the choke $C_1$ functions. Large hysteresis torque $H_2$ is produced by the choke $C_2$. The reason why the small hysteresis torque $H_1$ in a range of large torsional angle is seen is that when small torsional vibration (for example, combustion fluctuation) is caused in a state where the drive plate 5 is rotated through a predetermined angle relative to the driven member 6, the slide stopper 10 is separated from the end in the circumferential direction of the recess 6c of the driven member 6 so that the choke $C_1$ functions. Since the small hysteresis torque $H_1$ can be thus produced irrespective of the relative angle of the drive plate 5 with the driven member 6, it is possible to effectively damp slight vibration at the time of, for example, combustion fluctuation.

In the dynamic torsional characteristics shown in FIG. 9, viscosity becomes significantly larger than the conventional one. The reasons for this are mainly as follows:

⊚ Since a sufficient amount of fluid is returned to the annular fluid chamber 7a from the window hole 6a of the driven member 6, it is difficult to cause the shortage of viscous fluid.

⊚ Since the sealing member 11 seals the annular fluid chamber 7a and the driven member 6 is integrally formed, little fluid leaks.

⊚ A dry frictional force produced by pressing the radially outer surface of the slide stopper 10 against the radially inner surface of the rim 2c is added to the viscosity.

Since a large viscous damping force is exerted on such a large torsional angle, back-and-forth vibration of the body of an automobile at the time of tip-in and tip-out and vibration thereof at the time of starting the engine are restrained.

Description will now made of method of assembly of the above described flywheel assembly 1.

First, the rolling bearings 22 and 23 are forced into the radially inner portion of the driven boss 6a of the driven member 6. The driven member 6 with the bearings 22 and 23 mounted thereon is mounted on the first flywheel 2. At this time, the bearings 22 and 23 are forced into the radially outer portion of the hub portion 2a of the first flywheel 2. The sealing member 11 is previously inserted into the annular groove 2d of the first flywheel 2. After the driven member 6 is mounted on the first flywheel 2, the snap ring 24 is mounted on the hub portion 2a. Further, the spring sheet 13 and the coil springs 12a, 12b and 12c are mounted on the driven member 6. The stopper members 8 are mounted in the annular fluid chamber 7a with the pins 9, and the slide stopper 10 is further inserted into the annular fluid chamber 7a. In this state, fluid (for example, grease) is put in a portion corresponding to the fluid chamber 7a. The drive plate 5, an annular groove of which the sealing member 11 is inserted, is fixed to the rim 2c of the first flywheel 2 by the bolts 19. Subsequently, the sealing member 20 is inserted between the radially inner portion of the drive plate 5 and the radially outer portion of the driven boss 6a.

After the viscous damper mechanism 4 is assembled in the above described manner, the second flywheel 3 is fixed to the driven boss 6a of the driven member 6 using bolts 21.

In such an assembling method, the second flywheel 3 can be easily mounted and removed by removing or tightening the bolt 21. Moreover, in mounting and removing the second flywheel 3, the bearings 22 and 23 and the sealing member 20 need not be touched, thereby decreasing wear on the bearings 22 and 23 and the sealing member 20; thus lengthening their usable lifespan.

Figure 10:
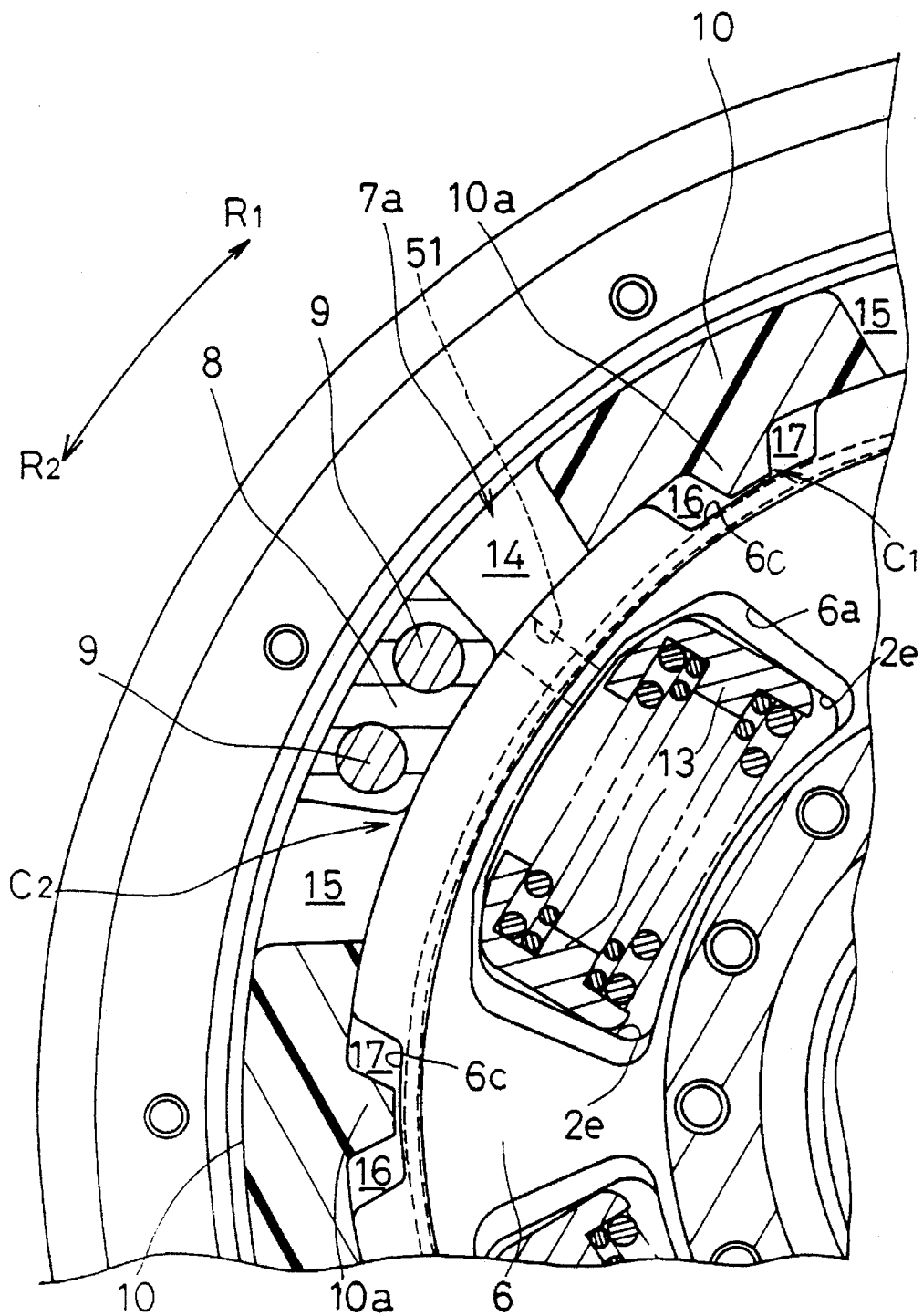
FIG. 10 is view similar to FIG. 4 showing another embodiment of the present invention.

In another embodiment of the present invention, the position of the liquid supplying hole is changed, as shown in FIG. 10, thereby it is possible to adjust torsional characteristics. If a fluid supplying hole 51 is shifted in the direction of rotation $R_2$, as shown in FIG. 10, the fluid supplying hole 51 openly communicates with the first arcuate chamber 14 at the time point where a slide stopper 10 abuts against a driven member 6 (a state shown in FIG. 6 in the above described embodiment). Consequently, a choke $C_2$ does not function until the fluid supplying hole 51 is filled with a stopper member 8. The position and the size of a fluid supplying hole and the number of fluid supplying holes are thus changed, thereby to make it possible to adjust the torsional characteristics.

Figure 11:
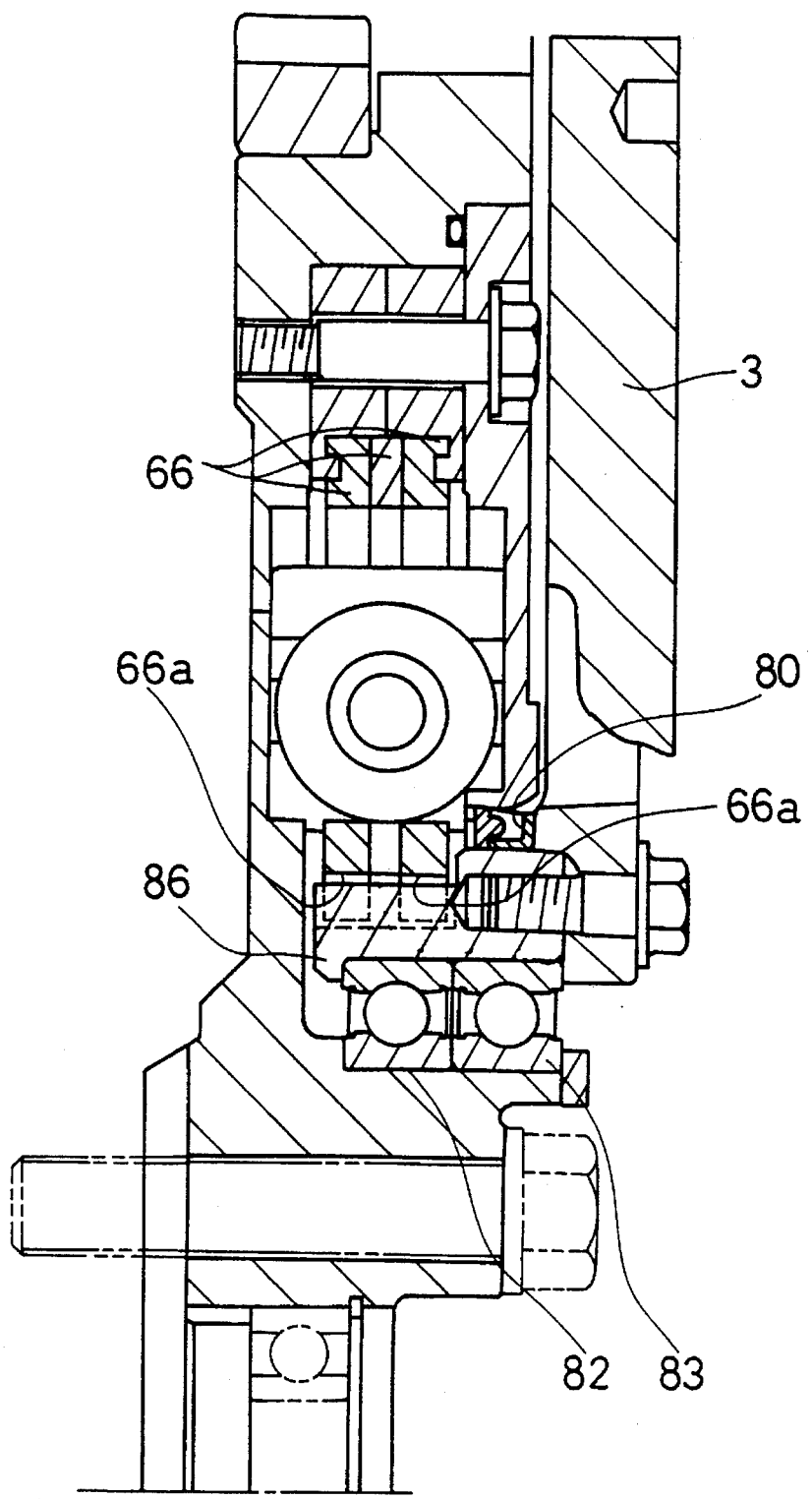
FIG. 11 is a view similar to FIG. 2 showing still yet another embodiment of the present invention.

In still another embodiment, an example in which a driven member and a driven boss are separately provided is shown in FIG. 11. In this case, the driven member in the above described embodiment is constituted by three driven plates 66. Wave-shaped inner teeth 66a are formed in a radially inner portion of the driven plate 66, and wave-shaped outer teeth which are engaged with the wave-shaped inner teeth 66a are formed in a radially outer portion of a driven boss 86. The driven plate 66 and the driven boss 86 are thus separated from each other by a serration, whereby the deflection of a second flywheel 3 does not easily affect the driven plate 66. As with the first embodiment, the present embodiment allows for easy removal of the second flywheel 3, improving duration in which the rolling bearings 82 and 83 are usable. The embodiment depicted in FIG. 11 also includes a seal member 80, which is similar to the seal 220 depicted in FIG. 2.

Various details of the invention may be changed without departing from its spirit nor its scope. Furthermore, the foregoing description of the embodiment according to the present invention is provided for the purpose of illustration only, and not for the purpose of limiting of the invention as defined by the appended claims and their equivalents.

What is claimed is:

1. A torsional vibration damping device comprising:
   a first flywheel connectable to an output shaft of a rotary power source;
   an input member rigidly connected to said first flywheel, said first flywheel and said input member at least partially defining an annular chamber having a plurality of arcuate chambers therein, at least a first and a second of said arcuate chambers in fluid communication with each other;

an output rotation member disposed in said annular chamber coupled to said input member for limited rotary displacement, said output rotation member having a circumferential surface formed with a plurality of first cam surfaces thereon;

a stopper member fixed to said first flywheel, said stopper member and said circumferential surface of said output rotation member defining a choke within said annular chamber between said first and second arcuate chambers which partially restricts fluid passage therebetween in response to relative rotary displacement between said input member and said output rotation member; and a plurality, of discrete slider members, each of said slider members being formed with a radially inwardly extending protrusion, said protrusion having at least one second cam surface formed thereon, each of said slider members disposed within said annular chamber proximate to one of said first cam surfaces, said second cam surface of each of said slider members engageable with a corresponding one of said first cam surfaces in response to relative movement of said first flywheel and said output rotation member, and each of said slider members engageable with said first flywheel for producing friction in response to contact between said first cam surface and said second cam surface, and each of said slider members engageable with said first flywheel for producing friction in response to centrifugal forces.

2. A torsional vibration damping device as set forth in claim 1 further comprising:

said first flywheel being formed with an axial surface and an inner radial surface adjacent to said axial surface;

said input member and said first flywheel surfaces at least partially define said annular chamber; and each of said slider members being engageable with at least one of said flywheel surfaces in response to contact between said first cam surface and said cam second surface and centrifugal forces for producing friction and each of said slider members made of a resin material.

3. A torsional vibration damping device as set forth in claim 2 further comprising:

an annular seal disposed between an axial face of said output rotation member and said axial surface of said first flywheel, said annular seal disposed radially inward from and adjacent to said arcuate chambers.

4. A torsional vibration damping device as set forth in claim 2 further comprising:

an annular seal disposed between an axial face of said output rotation member and an axial face of said input member, said annular seal disposed radially inward from and adjacent to said arcuate chambers.

5. A torsional vibration damping device comprising:

a first flywheel coupleable to the output shaft of a rotary power device, said first flywheel having an inner radial surface and a plurality of radially spaced apart first fluid reservoirs;

a plurality of inwardly extending projections disposed on said inner radial surface of said first flywheel;

an input member rigidly connected to said first flywheel, said first flywheel and said input member at least partially defining an annular chamber;

an output rotation member at least partially extending into said annular chamber for limited relative rotary displacement with said first flywheel, said output rotation member having a circumferential surface, a plurality of radially spaced apart second fluid reservoirs in one to one correspondence with said first fluid reservoirs, and a plurality of fluid conduits formed in said output rotation member extending from said second fluid reservoirs to said circumferential surface, said circumferential surface of said output rotation member and said projections defining a plurality of arcuate chambers within said annular chamber, said circumferential surface and each of said projections further defining a first choke for allowing restricted fluid flow between adjacent arcuate chambers in response to relative displacement of said first flywheel and said output rotation member, and said projections being displaceable from a first position to at least a second position with respect to said fluid conduits response to relative displacement of said first flywheel and said output rotation member, wherein in said first position said projections are displaced away from said fluid conduits thus exposing said fluid conduits to at least one of said arcuate chambers and in said second position said projections at least partially cover said fluid conduits;

wherein said circumferential surface on said output rotation member being formed with a plurality of radially spaced apart recesses, each recess formed with opposing cam surfaces;

a plurality of discrete arcuate members slidably disposed within each arcuate chamber, each formed with an inwardly extending projection disposed in said recess between said cam surfaces, each of said arcuate member projections and each of said corresponding recesses defining two sub-chambers and a choke therebetween for limiting fluid flow between said sub-chambers in response to limited rotary displacement between said first flywheel and said output rotation member, each of said arcuate members being engageable with said cam surface in response to relative movement of said first flywheel and said output rotation member, to engage said first flywheel surface for producing friction and each of said arcuate members being engageable with said inner radial surface of said first flywheel to produce friction in response to centrifugal forces.

6. A torsional vibration damping device as set forth in claim 5 further comprising:

a plurality of elastic spring members, one spring member disposed in each of said corresponding reservoirs in said first flywheel and said output rotational member for limiting rotational movement therebetween.

7. A torsional vibration damping device as set forth in claim 5 further comprising:

an annular seal disposed between an axial face of said output rotation member and an axial surface of said first flywheel, said annular seal disposed radially inward from said arcuate chambers.

8. A torsional vibration damping device as set forth in claim 5 further comprising:

an annular seal disposed between an axial face of said output rotation member and an axial face of said input member, said annular seal disposed radially inward from said arcuate chambers.

9. A torsional vibration damping device as set forth in claim 5 wherein said fluid conduits are symmetrically spaced about said output rotation member such that in said second position said projections at least partially cover said conduits with no relative displacement between said first flywheel and said output rotation member thus inhibiting fluid communication between said fluid conduits and said arcuate chambers.

10. A torsional vibration damping device as set forth in claim 5 wherein said fluid conduits are offset from said projections and said fluid conduits are in fluid communication with at least one of said arcuate chambers with said projections in said first position and with no relative displacement between said first flywheel and said output rotation member.

11. A torsional vibration damping device comprising:

an first flywheel coupleable to an output shaft of a rotary power source;

an input member connected to said first flywheel forming a viscous fluid filled annular fluid chamber therebetween;

an output member coupled to said first flywheel for limited rotary displacement therebetween, through which power is transmittable, said output member having an outer circumferential surface with a cam first surface formed thereon exposed to said fluid chamber; and a viscous damper mechanism disposed in said fluid chamber having means for generating at least two differing levels of viscous damping force in response to relative rotational displacement between said first flywheel and said output member, including a plurality, of discrete slider parts each having a radially inwardly extending protrusion formed thereon, a cam second surface formed on said protrusion, each of said slider parts and said output member defining at least two arcuate chambers and a choke disposed between said arcuate chambers for restricting fluid flow therebetween, said second cam surface being engageable with said first cam surface in response to relative rotation of said first flywheel and said output member, said slider part contacting a surface of said first flywheel thus producing friction for damping torsional vibration in response to engagement between said first cam surface and said cam surface and centrifugal forces.

12. A torsional vibration damping device comprising:

a first flywheel formed with an axial surface and an inner radial surface adjacent to said axial surface;

a plurality of inwardly extending projections disposed on said inner radial surface of said first flywheel;

an input member rigidly connected to said first flywheel, said first flywheel surfaces and said input member at least partially confining an annular chamber;

an output rotation member at least partially extending into said annular chamber having a circumferential surface with a plurality of recesses generally equally spaced apart from one another along said circumferential surface, each recess having cam surfaces formed therein, said output rotation member and said projections defining a plurality of arcuate chambers within said annular chamber, said circumferential surface and each of said projections further defining a first choke for allowing restricted fluid flow between adjacent arcuate chambers in response to relative displacement of said first flywheel and said output rotation member; and a plurality of discrete arcuate members slidably disposed within each arcuate chamber, each of said arcuate members formed with an inwardly extending projection disposed in said recess between said cam surfaces, each of said arcuate member projections and each of said corresponding recesses defining two sub-chambers and a choke therebetween for limiting fluid flow between said sub-chambers in response to limited rotary displacement of said first flywheel and said output rotation member, said projections engageable with said cam surfaces in response to relative movement of said first flywheel and said output rotation member, said arcuate member engageable with at least one of said first flywheel surfaces for producing dry friction in response to engagement of said projections with said cam surfaces and centrifugal forces.

13. A torsional vibration damping device as set forth in claim 12 further comprising:

an annular seal disposed between an axial face of said output rotation member and said axial surface of said first flywheel, said annular seal disposed radially inward from said arcuate chambers.

14. A torsional vibration damping device as set forth in claim 12 further comprising:

an annular seal disposed between an axial face of said output rotation member and an axial face of said input member, said annular seal disposed radially inward from said arcuate chambers.

15. A torsional vibration damping device as set forth in claim 12 further comprising:

said axial surface of said first flywheel having a plurality of radially spaced apart first fluid reservoirs formed thereon;

said output rotation member having a plurality of radially spaced apart second fluid reservoirs formed therein in one to one correspondence with said first fluid reservoirs, and a plurality of fluid conduits, each conduit extending from one of said second fluid reservoirs to said circumferential surface, and said projections selectively exposing said fluid conduits to at least one of said arcuate chambers in response to relative displacement of said first flywheel and said output rotation member.

16. A torsional vibration damping device as set forth in claim 15 further comprising:

a plurality of resilient spring members, at least one spring member disposed in one of said first fluid reservoirs and one of said second fluid reservoirs, such that one end of said spring member contacts said first flywheel and another end of said spring member contacts said output rotation member limiting rotary displacement therebetween.

* * * * *